United States Patent [19]

Yamanaka

[11] Patent Number: 5,040,625
[45] Date of Patent: Aug. 20, 1991

[54] INEQUALITY CONFINED COMBINATION WEIGHER

[75] Inventor: Masami Yamanaka, Miki, Japan

[73] Assignee: Yamato Scale Company, Limited, Akashi, Japan

[21] Appl. No.: 541,634

[22] Filed: Jun. 21, 1990

[30] Foreign Application Priority Data

Aug. 15, 1989 [JP] Japan .................................. 1-210372

[51] Int. Cl.⁵ ...................... G01G 13/16; G01G 11/08
[52] U.S. Cl. .................................. 177/25.18; 177/59; 198/580
[58] Field of Search ................. 177/25.18, 59; 198/505

[56] References Cited

U.S. PATENT DOCUMENTS

| | | | |
|---|---|---|---|
| 3,708,025 | 1/1973 | Soler et al. ............................. | 177/70 |
| 4,206,822 | 6/1980 | Mazzucchelli .................... | 177/25.18 |
| 4,336,852 | 6/1982 | Hirano . | |
| 4,418,771 | 12/1983 | Henry et al. ....................... | 177/59 X |
| 4,627,012 | 12/1986 | Yamada ........................ | 177/25.18 X |
| 4,645,020 | 2/1987 | Haze ............................. | 177/25.18 X |
| 4,773,527 | 9/1988 | Albiol-Catalan .................... | 198/505 |
| 4,836,310 | 6/1989 | Yamano ........................... | 177/25.18 |
| 4,838,368 | 6/1989 | Sato et al. ........................ | 177/25.18 |
| 4,858,708 | 8/1989 | Kohno .............................. | 177/25.18 |

*Primary Examiner*—George H. Miller, Jr.
*Attorney, Agent, or Firm*—Senniger, Powers, Leavitt & Roedel

[57] ABSTRACT

One kind of combination weigher, used for selecting a predetermined number of articles having substantially same weights from a group of articles having substantial variance or inequality in their weights, which is provided with a plurality of independent weigh units and adapted to weigh an article by each unit at the same time, process the resultant weight signals by a computer to select a combination of a predetermined number of weight signals whose variance or inequality satisfies a predetermined condition from various combinations of the weight signals, and indicate those weight units attributable to the selected combination by pilot lamps, for example.

49 Claims, 5 Drawing Sheets

INEQUALITY CONFINED COMBINATION WEIGHER

BACKGROUND OF INVENTION

This invention relates to a combination weigher, and particularly to a combination weighing device useful in preparing packs of articles whose individual weights do not vary from each other by more than a predetermined range.

In the case of producing packs or packages each containing plurality of articles having a total weight within an allowable range, it is well known that a so-called combination weigher is effectively used for this purpose. Such combination weigher is disclosed, for example, in U.S. Pat. No. 4,336,852. The combination weigher is provided with a plurality of mutually independent weighing units and is adapted to weigh one or more articles by each unit at the same time, combine the resultant weight indicative signals from the weigh units in various fashions, select from the resultant combinations a combination having a total weight within a predetermined range, and deliver the articles from the corresponding weigh units. Although such combination weigher is conveniently used for producing a number of packs of the same weight of content, the individual articles contained in each pack are not always uniform in their respective weights, and in fact substantial inequality or variance is unavoidable therein.

However, in the case, for example, of small fishes or culets of fish or meat prepared for cooking, it is often more desirable that the number of individual pieces in each pack be constants, and that the weight or size of each piece in the pack be as uniform as possible, rather than have the total weight of each pack be uniform. It is impossible to prepare such packs by the known combination weigher as disclosed above (unless the articles to be weighed are previously sorted as uniform in their individual weights).

SUMMARY OF INVENTION

Accordingly, an object of this invention is to provide a weighing device which can select a predetermined number of articles whose individual weights are within a predetermined range out of a group of articles having a substantial variance in their individual weights.

Generally, the weighing device of this invention comprises a plurality of weighing units each adapted to weigh an article to produce a signal indicative of its weight, means for combining a predetermined number of signals extracted from the resultant weight indicative signals, and means for selecting from the resultant combinations a combination of articles whose individual weight are within a predetermined range of each other.

These and other objects and features of this invention will be described in more detail below with reference to the accompanying drawings.

DETAILED DESCRIPTION OF PREFERRED EMBODIMENT

Figure 1:
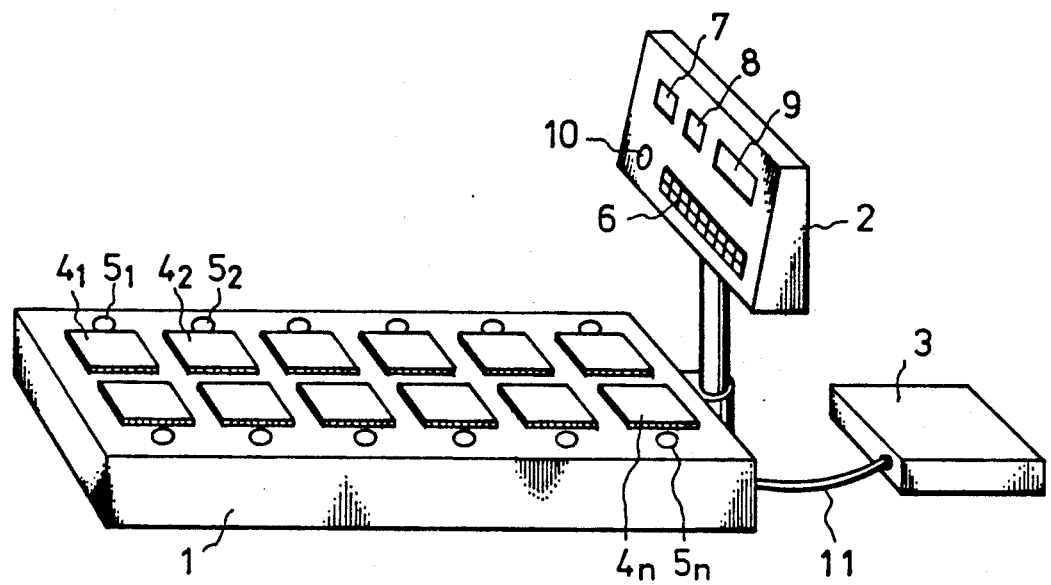
FIG. 1 is a perspective view of a weighing device constructed according to the principles of this invention.

Referring to FIG. 1, the weighing device of this invention includes a table-like main body 1, a display and control board 2 and a label printer 3. A plurality "n" (n=12 in the drawing) of weighing platforms $4_1$ to $4_n$ are arranged on the upper surface of the main body 1. The weighing platforms are coupled to respective weight detectors (not shown) enclosed in the main body to form a plurality of mutually independent weigh units. A plurality of pilot lamps $5_1$ to $5_n$ are disposed on the upper surface of the main body in correspondence to the respective weighing platforms. An input keyboard 6, display windows 7, 8, and 9 for "number", "allowance", and "total weight", respectively, and a combination pilot lamp 10 are provided on the display and control board 2. The term "number" means the number "m" (m<n) of articles to be packed in each pack. "Allowance" means a critical value for confining a degree of variance of the individual weights of the articles packed in each pack, for example, an allowable upper limit of the difference between the highest and lowest values, namely, the range of the individual weights "Total weight". means the sum of measured weights of the articles in each pack. As described below, various values other than the above can be used as the "allowance". The label printer 3 is connected with the main body 1 by a cable 11, to serve a function as described below.

Figure 2:
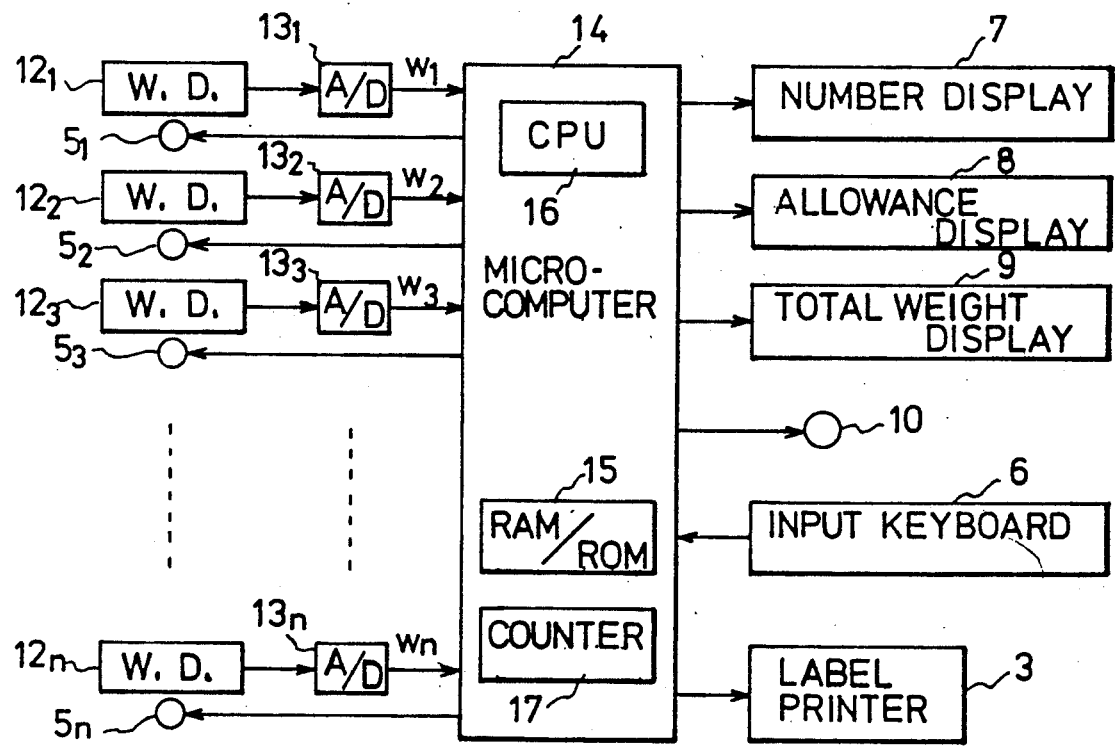
FIG. 2 is a block diagram representing a data processing system of the weighing device of FIG. 1.

Referring to FIG. 2, the outputs of weight detectors $12_1$ to $12_n$ coupled to the respective weighing platforms $4_1$ to $4_n$ (FIG. 1) are respectively connected through analog-to-digital (A/D) convertors $13_1$ to $13_n$ to a microcomputer 14. The microcomputer 14 includes a memory device 15 including a random-access memory (RAM) for numerical storage and a read-only memory (ROM) for program storage, a central processing unit (CPU) 16 for numerical processing in accordance with the program, and a counter 17 for operations as described below. The microcomputer 14 is adapted to receive input data from the input keyboard 6 and to supply output data to a number dispay 7, an allowance display 8, a total weight display 9, and the label printer 3. The microcomputer 14 also controls the pilot lamps 5 and 10 in accordance with a command from the CPU 16.

Before operation, an operator inputs a predetermined "number" m and "allowance" Al through the keyboard 6 to display them in the display windows 7 and 8 and also store them in the RAM of the memory device 15. Thereafter, operator puts an article on each weighing platform 4. Then, the weight detectors $12_1$ to $12_n$ detect the weights of the articles on the corresponding weighing platforms to produce weight signals $w_1$ to $w_n$ indicative of these weights. The weight signals are converted into digital form by the A/D convertors $13_1$ to $13_n$ and supplied to the microcomputer 14 to be stored in the RAM of the memory device 15. According to the program, as described below, the CPU 16 of the microcomputer 14 successively reads out the weight signals, forms combinations of "m" members, selects a combination of weight signals passing the allowance and calculates the total weight of the combination to display it in the display window 7, and also lights the pilot lamps 5 belonging to the weighing platforms contributing to the combination. When no acceptable combination is obtained, it lights the combination pilot lamp 10 to indicate this condition.

Figure 3:
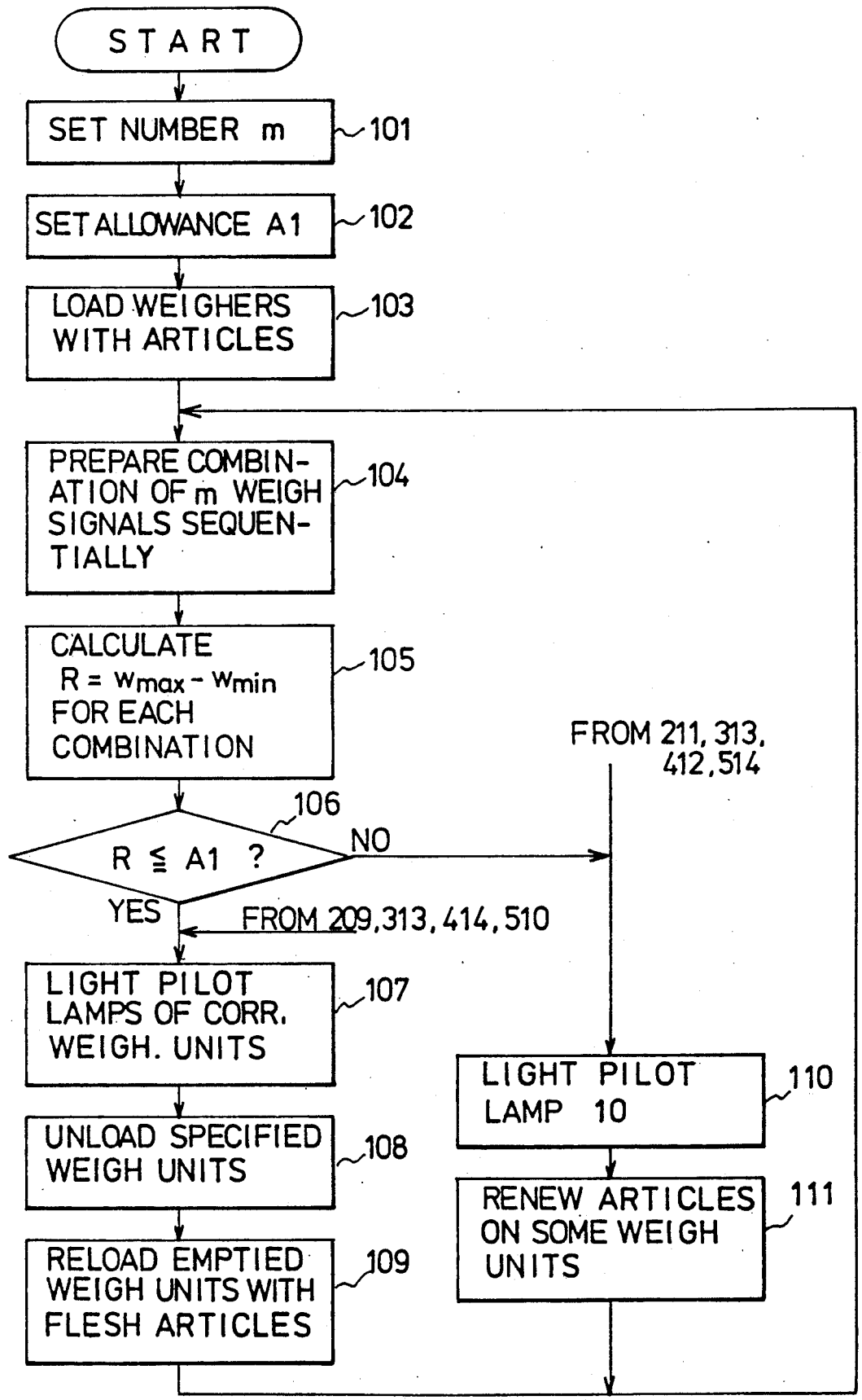
FIGS. 3 to 8 are flow charts representing six preferred examples of program used in a microcomputer included in the system of FIG. 2.

A first example of the operation program of the abovementioned embodiment will be described below with reference to FIG. 3. The operator first uses the input keyboard 6 to set the "number" m (m<n) (step 101). The value m is displayed in the display window 7. Then, the operators uses the input keyboard 6 again to set the "allowance" Al (step 102). In this example, the allowance is an allowable upper limit of the range of the individual weights of the articles, as described above. This value Al is displayed in the display window 8. Then, the operator puts an article on each of the weighing platforms $4_1$ to $4_n$ (step 103). Then, the weight signals $w_1$ to $w_n$ are supplied from the weight detectors $12_1$ to $12_n$ to the microcomputer 14 and written in the memory device 15. The CPU 16 of the microcomputer 14 successively reads out each of these n weight signals to form combinations, each composed of m members (step 104), calculates the range of the weight signals of each combination (step 105), and compares the range with the preset allowance Al (step 106). When the CPU 16 encounters a combination having a range R not greater than Al, the CPU lights the pilot lamps 5 belonging to those weighing units which are a part of the combination (step 107). The CPU 16 also calculates the total weight of this combination to display it in the display window 9, and it further calculates a selling price from a separately preset unit price and supplies these values to the label printer 3. The label printer 3 prints these values on a label together with separately preset data, such as date. The operator removes the articles from those weighing platforms specified by the pilot lamps 5 (step 108), packs them in the same package, and attaches thereon the label printed by the printer 3. Thereafter, he put a new article on each of the emptied weighing platform (step 109). Then, the same operation is repeated from step 104, and a new combination is obtained.

If the CPU 16 encounters no combination having a range R less than or equal to than Al in step 106, it lights the combination pilot lamp 10 (step 110). In this event, no further progress of the program is expected unless the circumstances change. Therefore, the operator replaces the articles on some of the weighing platforms 4 with new articles to resume operation (step 111). Alternatively, the operator may resume operation by slightly loosening the preset allowance, Al although this may result in a slightly unacceptable pack at this time.

Figure 4:
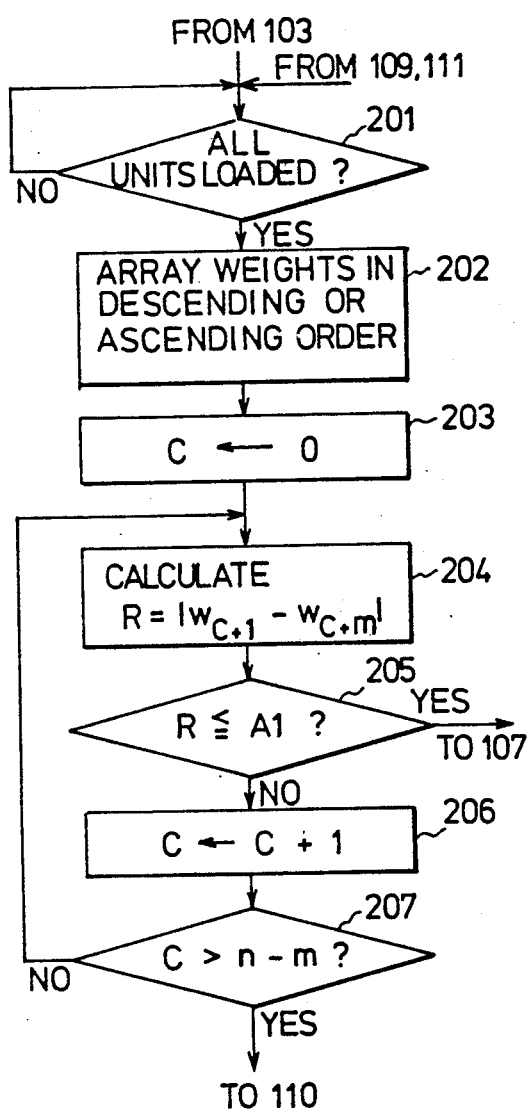

As will be understood from the above description, packs each containing articles having a difference between the maximum and minimum (i.e., a range) of their individual weights not greater than the allowable upper limit can be obtained by this program. However, the combination selected in each operation cycle does not always realize the least range of all the possible combinations, though it satisfies the condition of step 106. A second example of the operation program which can select such a more preferable combination will be described below with reference to FIG. 4.

In this example, the "number" m and "allowance" Al are set and the weighing platforms are loaded with articles to write weight signals $w_1$ to $w_n$ in the memory device 15 in accordance with steps 101, 102 and 103 (FIG. 3) of the first example. Thereafter, the CPU 16 checks whether all the number of weight signals exist or not, i.e. whether all the weighing platforms are full (step 201) and, after confirming their existence, arranges the weight signals in ascending (or descending) order from the first to the nth (step 202). Here, the CPU 16 initializes the counter 17 to reset its count C to zero (step 203). Then, the CPU 16 calculates an absolute value of the difference between the (C+1)th and (C+m)th (namely, first and m-th) weight signals (step 204) and compares it with the preset allowance Al (step 205). If this difference R is greater than Al, the CPU increases the counter C by one (step 206) and compares the resultant count C with the difference n−m (step 207). If C is not greater than n−m, it returns to step 204 to perform another comparing operation. In the second cycle, a difference between the second and (m+1)th weight signals is calculated in step 204. When the condition of step 205 is satisfied (i.e., when the range R of the individual weights is less than the allowance Al, steps 107 and 109 of FIG. 3 are executed and the articles of the selected combination are removed from the corresponding weighing platforms. Then, the unloaded platforms are reloaded with new articles and the operation resumes at step 201 of FIG. 4.

When C exceeds n−m in step 207, this means that a desired combination is not obtainable in these circumstances. Therefore, the CPU 16 returns to step 110 of FIG. 3 to light the pilot lamp 10 and the operator exchanges some of the articles or the weighing platforms (step 111) and returns the program to step 201.

It should be understood that the second example does not yet realizes the least range of all possible combinations though it is nearer the object of the invention in effect than the first example. A description will be made of a third example, which can realize the least range, with reference to FIG. 5.

In this third example memory locations for combination and reference range $R_r$ are reserved in the RAM of the memory device 15. After executing the above-mentioned steps 101, 102 and 103 (FIG. 3) and steps 201 and 202 (FIG. 4) to array the weight signals in ascending (or descending) order from the first to the n-th, the CPU 16 resets the counter 17 to zero, clears the combination memory location, and writes the maximum weight signal $w_{max}$ in the reference range memory location as a reference range $R_r$ (step 301). Then the CPU calculates the difference R between the first and m-th weight signals as in step 204 (FIG. 4) and compares this difference with the stored reference range $R_r$ (step 303). When R is less than $R_r$, the newly calculated value of R is substituted for the stored value $R_r$, and the current combination is stored in the RAM (step 304). When R is not less than $R_r$, $R_r$ is left unchanged. Next, the count C of the counter is increased by one (i.e., to one) (step 305) and the count C is compared with the difference n−m (step 306). If C is not greater than n−m, it returns to step 302 to repeat the operation. In the next cycle, the difference between the second and (m+1)th weight signals is calculated and, when $R_r > R$ in step 303, the value of $R_r$ is substituted and the stored combination is replaced with the current combination. During successive operations, as the weight signals compared are shifted one by one and the range R is calculated and processed in steps 303 and 304, the value of $R_r$ in the reference range memory location becomes smaller and smaller. If C exceeds n−m in step 306, the above repeated operation stops. The range $R_r$ of the combination left in the combination memory location at this time will be least of all the possible combinations. This value of range $R_r$ is compared with the preset allowance Al (step 307) and, if it is not greater than the latter, steps 107, 108 and 109 of FIG. 3 are executed to pack the selected articles and new articles are supplied to the empty weighing platforms. If the condition of step 307 is not satisfied, this means that no desired combination exists and, therefore, steps 110 and 111 of FIG. 3 are executed to repeat the operation as described above.

Figure 6:
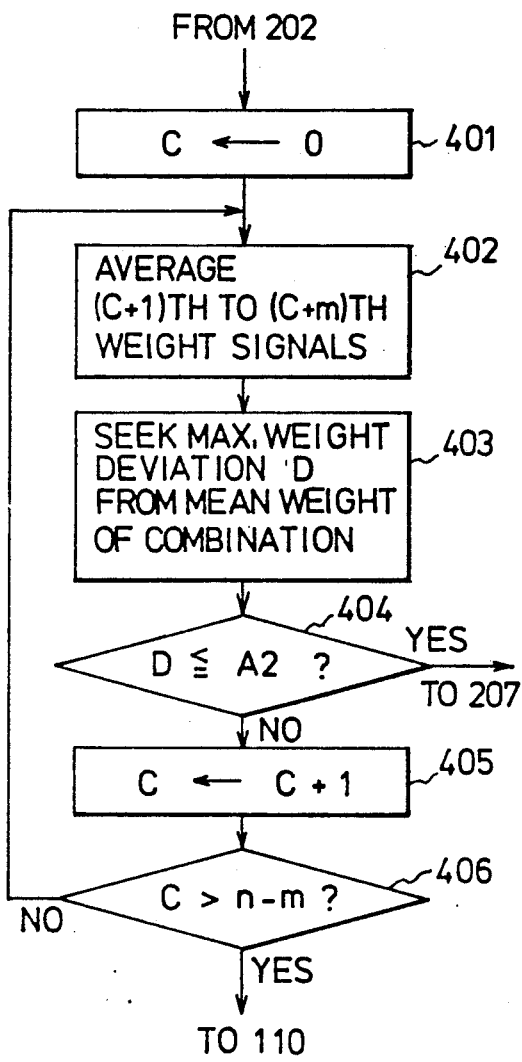

While the above-described three examples confine the range of individual weights of the articles in each pack, the object of the invention is attained also by confining the deviation of individual weights from the mean value thereof. A fourth example of the operation program in this respect will be described below with reference to FIG. 6.

Steps 101, 102 and 103 (FIG. 3) of the first example and steps 201 and 202 (FIG. 4) of the second example are first executed to array the weight signals as same as in the above example, and the allowance of step 102 is assumed as an allowable upper limit A2 of deviations D of the individual weight of the articles in each pack from the mean value thereof. After resetting the count C of the counter 17 to zero (step 401), the CPU 16 calculates the mean value of the first to m th weight signals (step 402) and determines the deviation D of the maximum weight signal from the mean value (step 403). It compares the deviation D with the preset allowance A2 (step 404) and, if D is greater than A2, it raises the count C of the counter by one (step 405) and compares this value of C with the difference $n-m$ (step 406). If C is not greater than $n-m$, it returns to step 402 to repeat the operation. In the next cycle, the second to (m+1)th weight signals are averaged. When the CPU encounters a deviation D not greater than A2 in step 404 while it shifts such m-number of successive weight signals one by one and averages them in this manner, it executes steps 107, 108 and 109 (FIG. 3) to replace the articles of the selected combination and return to step 201. If C exceeds $n-m$ in step 406, it executes steps 110 and 111 and returns to step 201. The operation is repeated thereafter.

Figure 7:
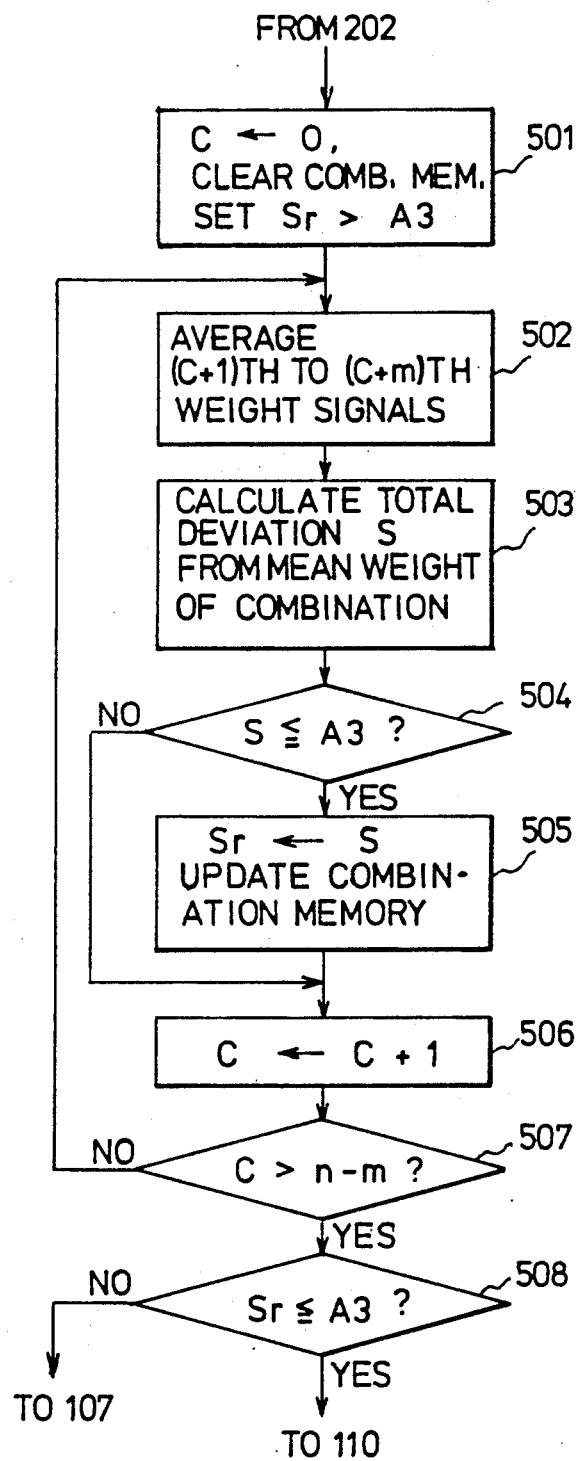

While only the article having the greatest deviation of individual weight is concerned in the program of the fourth example, it is also possible to have a program in which all deviations of the individual weights are considered to make them as small as possible. Such a program will be described as a fifth example with reference to FIG. 7.

In this fifth example, memory locations for combination and reference total deviation $S_r$ are reserved in the RAM of the memory device 15. As in the fourth example, steps 101, 102 and 103 (FIG. 3) of the first example and steps 201 and 202 (FIG. 4) of the second example are executed first to array the weight signals, and the allowance in step 102 is assumed as an allowable upper limit A3 of the sum S of deviations of the individual weights of the articles in each pack in this case. Next, the CPU 16 resets the count C of the counter 17 to zero, clears the combination memory location, and writes the allowance A3 in the reference total deviation memory location as the reference total deviation $S_r$ (step 501). The CPU 16 then calculates the mean value of the first to m-th weight signals (step 502) and also calculates a sum S of deviations of the individual weight signals from the mean value (step 503). The sum is compared with the preset reference total deviation $S_r$ (step 504) and, if S is not greater than $S_r$, the CPU updates the value of $S_r$ in the reference total deviation memory location with the value of S and writes the current combination in the combination memory location (step 505). If S is greater than $S_r$, the CPU leaves the condition as it is. Then, the count C of the counter is increased by one (to one) (step 506) and the CPU compares the count C with the difference $n-m$ (step 507). If C is not greater than $n-m$, the CPU returns to step 502 to average the second to (M+1)th weight signals and calculates the total deviations of individual weights from the average (step 503). The CPU repeats the above operations thereafter and updates the value of $S_r$ and the stored combination every time the condition of step 504 is satisfied. Thus, the least value of total deviation and a combination giving the same are stored in the RAM of the memory device when C finally exceeds $n-m$. Then, the value of $S_r$ is compared with the allowance A3 (step 508) and, if it is not greater than the allowance, steps 107, 108 and 109 (FIG. 3) are executed to update the weighing platforms of the selected combination and the CPU returns to step 201. If $S_r$ is greater than the allowance, A3 steps 110 and 111 are executed to return to step 201. Thereafter, the above operations are repeated.

While the total deviation is considered in the above fifth example, a sum of square deviations or a mean square deviation (namely, variance) can be used instead of total deviation. It is well known in the field of theory of inference that this alternative is rather reasonable for confining variation of values.

Figure 8:
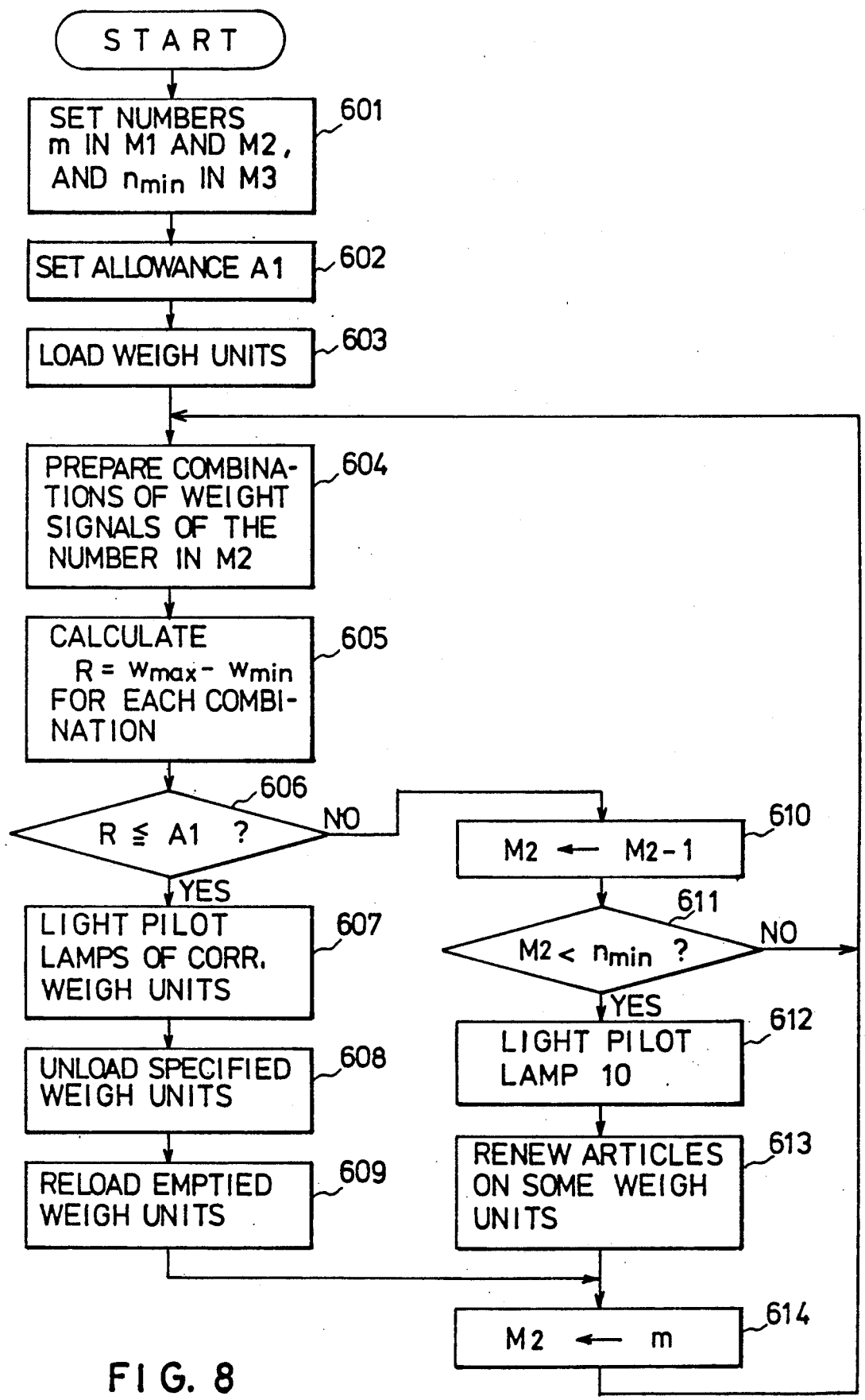

While, in the above described examples, steps 110 and 111 are executed to update some of the weighing platforms when no acceptable combination is obtained, this operation is actually troublesome and inefficient. However, it can be supposed that some acceptability grows when the number m of combined members is reduced if it need not be fixed. The operation program of a sixth example, arranged to reduce the number m one by one to continue the operation when no acceptable combination is obtained, will be described below with reference to FIG. 8. In this sixth example, the program is arranged, as concerning for the range R of weight signals of each combination as in the first example, that the number m is reduced one by one to repeat the operation unless the allowance Al is satisfied and the initial value of m is restored when the allowance is satisfied. When the reduced number reaches a predetermined lower limit $m_{min}$, some of the articles on the weighing tables are replaced as in the above examples. To this end. three number memory locations M1, M2 and M3 are reserved in the RAM of the memory device.

The operator first operates the keyboard 6 to write the normal number m in the memory locations M1 and M2 and the lower limit $m_{min}$ in the memory location M3 (step 601). Next, he sets the allowance Al (step 602) and loads each weighing platform with an article (step 603). Then, the CPU 16 successively prepares combinations of the number of members stored in the memory location M2 (step 604) and calculates the range R of individual weights of each combination (step 605). It compares each R with the allowance Al (step 606) and, when R is not greater than Al, lights the pilot lamps 5 relating to the combination (step 607) so that the specified weighing platforms 4 are unloaded (step 608) and reloaded (step 609) as same as in steps 107, 108 and 109 of the first example. While the CPU 16 restores the content of the memory location M2 to the normal number m in the next step 614, it returns to step 604 to repeat the same operation as leaving the content as it is since it is not yet changed. If R exceeds Al in step 606, the CPU reduces the content of the memory location M2 by one (step 610) and compares the reduced content of M2 with the lower limit $m_{min}$ (step 611). If the content of M2 is not less than the lower limit $m_{min}$, the CPU returns to step 604 to continue the same operation.

If the content of M2 is less than the lower limit $m_{min}$ in step 611, no desired combination will be obtained if the condition is unchanged. Therefore, the combination pilot lamp 10 is lit (step 612) so that some of the articles on the weighing platforms can be replaced with new articles (step 613) and the content of M2 is restored to the normal number m (step 614). Then, the similar operation is resumed, returning to step 604.

The above description on the embodiment and the operation programs has been made for illustrative purpose only and never means any limitation of the invention. It is evident to those skilled in the art that various modifications and changes can be added to the illustrated device and programs without leaving the spilit and scope of the invention which are defined in the appended claims.

For example, while the device of FIG. 1 is constructed for manually loading and unloading the weighing platforms, such operations can be automated by providing each weighing platform with a suitable loading and unloading device which is driven by the signal to each pilot lamp 5 from the microcomputer 14. It will be more convenient for such an automating purpose to use a three-dimensional structure of the known combination weigher rather than the table-like structure in FIG. 1. It is a matter of course that an automatic packing machine can be interlocked with the unloading device together with the printer 3.

Figure 5:
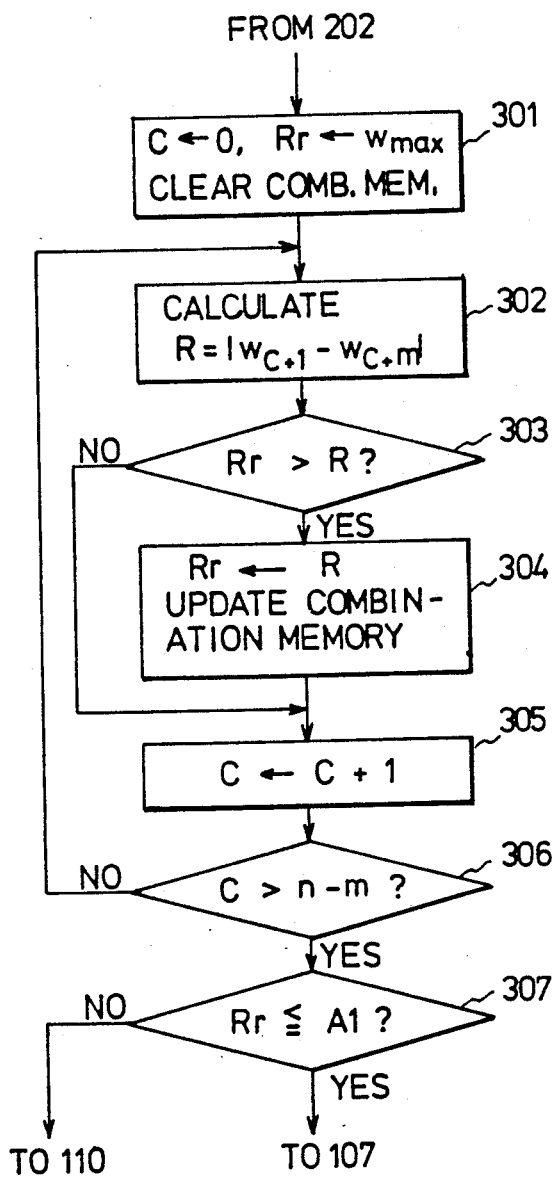

Moreover, it is also possible to modify the operation program by arbitrarily combining the features of the respective examples. In the sixth example, for example, it is possible to use the weight signal arraying process in step 202 (FIG. 4) in the second exmple, as well as the successive approximation of the third example (FIG. 5). It is further possible to utilize the systems of the fourth and fifth examples (FIGS. 6 and 7) in which the deviation from the mean value is concerned instead of the range of the individual weights.

Furthermore the number reduction for operation resumption in the sixth example may be applied to the preceding examples and, also, the reducing number for each time may be any number greater than one. Without arraying the weight signals, as in the conventional combination weigher, it is also possible to subject all possible combinations to judgment, as well as to seek the best combination within the allowance. After a specific combination is selected, the operation may be continued with the remaining loaded platforms and the articles on the selected platforms may be renewed during this operation, that is, a so-called "double shift" system may be applied.

Furthermore, the allowance may be determined for each combination based upon the individual weights thereof, while it has been previously established in the abovementioned examples. For example, it is possible to use as the allowance a product of the mean value of the individual weights in each combination and a predetermined coefficient. The coefficient may be 0.12 for the fifth example and 0.02 for the other examples, for instance. This system is often preferable since the allowance is variable in proportion to the mean weight and, moreover, it is less troublesome in setting operation since the calculation of the allowance can be programmed. Any statistical quantity such as standard deviation other than the above-mentioned values can be used as the allowance.

I claim:

1. A combination weigher for making a combination of articles whose members have weights that do not vary from each day by more than a predetermined amount, the weigher comprising a plurality of weighing units for weighing articles respectively to provide corresponding weight-indicative signals, and means for combining said weight-indicative signals in various combinations to select from the resultant combinations a combination satisfying a predetermined weight condition, characterized in that said condition limits the membership of the combination to weight signals that are within a predetermined amount of each other.

2. A combination weigher for making a combination of articles having a predetermined number of members whose individual weights do not vary from each other by more than a predetermined amount, the weigher comprising:
    a plurality of weighing units for weighing articles respectively to provide corresponding weight-indicative signals,
    means for registering said predetermined number of members;
    means for producing various combinations of weight-indicative signals having said predetermining number of numbers;
    and means for determining whether a combination meets a condition which limits the variance among the weight signals of the members of the combination, to select a combination satisfying the condition.

3. A combination weigher as set forth in claim 2, further comprising means for indicating the weighing units correponding to said selected combination.

4. A combination weigher as set forth in claim 2, wherein said combination producing means includes means for arranging said weight-indicative signals by their orders of magnitude, and means for making combinations of consecutively arranged weight-indicative signals, each combination having the predetermined number of members.

5. A combination weigher as set forth in claim 4, further comprising means for indicating the weighing units corresponding to said selected combination.

6. A combination weigher as set forth in claim 4, wherein said determining means includes means for calculating a range of the values of said weight-indicative signals in a combination, and means for comparing said calculated range with said specific condition, and wherein said specific condition is a predetermined allowable upper limit for said range.

7. A combination weigher as set forth in claim 4, wherein said determining means includes means for calculating a mean value and a range of the values of said weight-indicative signals in a combination, and means for comparing said calculated range with said specific condition, and wherein said specific condition is an allowable upper limit for said range which is given as a product of said calculated mean value and a predetermined coefficient.

8. A combination weigher as set forth in claim 4, wherein said determining means includes means for calculating a range of the values of said weight-indicative signals in a combination, means for seeking the combination having the least value of said range, and means for comparing said least value of said range with said specific condition, and wherein said specific condition is a predetermined allowable upper limit for said range.

9. A combination weigher as set forth in claim 4, wherein said determining means includes for calculating a mean value of the values of said weight-indicative signals in a combination, means for seeking the greatest deviation of the values of said weight-indicative signals from said calculated mean value, and means for comparing said greatest deviation with said specific condition, and wherein said specific condition is a predetermined allowable upper limit for said greatest deviation.

10. A combination weigher as set forth in claim 4, wherein said determining means includes means for calculating a mean value of the values of said weight-indicative signals in a combination, means for seeking the greatest deviation of the values of said weight-indicative signals from said calculated mean value, and means for comparing said greatest deviation with said specific condition, and wherein said specific condition is an allowable upper limit for said greatest deviation which is given as a product of said calculated mean value and a predetermined coefficient.

11. A combination weigher as set forth in claim 4, wherein said determining means includes means for calculating a mean value of the values of said weight-indicative signals in a combination, means for calculating a sum of deviations of the values of said weight-indicative signals from said calculated mean value, and means for seeking the combination having the least value of said sum.

12. A combination weigher as set forth in claim 4, wherein said determining means includes means for calculating a mean value of the values of said weight-indicative signals in a combination, means for calculating a sum of square deviations of the values of said weight-indicative signals from said calculated mean value, and means for seeking a combination having the least value of said sum.

13. A combination weigher as set forth in claim 4, wherein said determining means includes means for reducing said predetermined number of members and resuming the operation to select a combination with a reduced number of members, when no satisfactory combination having the predetermined number of members can be selected.

14. A combination weigher as set forth in claim 2, wherein said determining means includes means for calculating a range of the values of said weight-indicative signals in a combination, and means for comparing said calculated range with said specific condition, and wherein said specific condition is a predetermined allowable upper limit for said range.

15. A combination weigher as set forth in claim 2, wherein said determining means includes means for calculating a mean value and a range of the values of said weight-indicative signals in a combination, and means for comparing said calculated range with said specific condition, and wherein said specific condition is an allowable upper limit for said range which is given as a product of said calculated mean value and a predetermined coefficient.

16. A combination weigher as set forth in claim 2, wherein said determining means includes means for calculating a range of the values of said weight-indicative signals in a combination, means for seeking the combination having the least value of said range, and means for comparing said least value of said range with said specific condition, and wherein said specific condition is a predetermined allowable upper limit for said range.

17. A combination weigher as set forth in claim 2, wherein said determining means includes means for calculating a mean value of the values of said weight-indicative signals in a combination, means for seeking the greatest deviation of the values of said weight-indicative signals from said calculated mean value, and means for comparing said greatest deviation with said specific condition, and wherein said specific condition is a predetermined allowable upper limit for said greatest deviation.

18. A combination weigher as set forth in claim 2, wherein said determining means includes means for calculating a mean value of the values of said weight-indicative signals in a combination, means for seeking the greatest deviation of the values of said weight-indicative signals from said calculated mean value, and means for comparing said greatest deviation with said specific condition, and wherein said specific condition is an allowable upper limit for said greatest deviation which is given as a product of said calculated mean value and a predetermined coefficient.

19. A combination weigher as set forth in claim 2, wherein said determining means includes means for calculating a mean value of the values of said weight-indicative signals in a combination, means for calculating a sum of deviations of the values of said weight-indicative signals from said calculated mean value, and means for seeking the combination having the least value of said sum.

20. A combination weigher as set forth in claim 2, wherein said determining means includes means for calculating a mean value of the values of said weight-indicative signals in a combination, means for calculating a sum of square deviations of the values of said weight-indicative signals from said calculated mean value, and means for seeking the combination having the least value of said sum.

21. A combination weigher as set forth in claim 2, wherein said determining means includes means for reducing said predetermined number and resuming the operation to select a combination with a reduced number of members, when no satisfactory combination having the predetermined number of members can be selected.

22. A combination weighing method using a combination weigher including a plurality of weighing units for weighing articles respectively to provide corresponding weight-indicative signals, for selecting from said weight-indicative signals a combination of a predetermined number of members, the inequality of individual values of the weight-indicative signals included in said combination satisfying a specific condition; the method comprising the steps of:
registering said specific condition,
registering said predetermined number of members,
loading each weighing unit with an article to provide a corresponding weight-indicative signal,
producing various combinations of said predetermined number of said weight-indicative signals, and
comparing said combinations with said specific condition to select a combination satisfying the same.

23. A combination weighing method as set forth in claim 22, further comprising the step of indicating the weighing units corresponding to said selected combination.

24. A combination weighing method as set forth in claim 22, wherein said combination producing step includes the step of arranging said weight-indicative signals in order of magnitude, and the step of producing combinations of said predetermined number of consecutively arranged weight-indicative signals.

25. A combination weighing method as set forth in claim 24, further comprising the step of indicating the weighing units corresponding to said selected combination.

26. A combination weighing method as set forth in claim 24, wherein said comparing step includes the step of calculating a range of the values of said weight-indicative signals in at least some of the combinations, and a step of comparing at least some of said calculated ranges with said specific condition, said specific condition being a predetermined allowable upper limit for said range.

27. A combination weighing method as set forth in claim 24, wherein said comparing step includes the step of calculating a mean value and a range of the values of said weight-indicative signals in at least some of the combinations, the step of comparing at least some of said calculated ranges with said specific condition, said specific condition being an allowable upper limit for said range, and the step of calculating said allowable upper limit as a product of said calculated mean value and a predetermined coefficient.

28. A combination weighing method as set forth in claim 26, wherein said comparing step includes the step of calculating a range of the values of said weight-indicative signals in at least some of the combinations, the step of seeking the combination having the least value of said range, and the step of comparing said least range with said specific condition, said specific condition being a predetermined allowable upper limit for said range.

29. A combination weighing method as set forth in claim 24, wherein said comparing step includes a step of calculating a mean value of the values of said weight-indicative signals in at least some of the combinations, the step of seeking the greatest deviation of the values of said weight-indicative signals from said calculated mean value, and the step of comparing said greatest deviation with said specific condition, said specific condition being a predetermined allowable upper limit for said greatest deviation.

30. A combination weighing method as set forth in claim 24, wherein said comparing step includes the step of calculating a mean value of the values of said weight-indicative signals in at least some of the combinations, the step of seeking the greatest deviation of the values of said weight-indicative signals from said calculated mean value, the step of comparing said greatest deviation with said specific condition, said specific condition being an allowable upper limit for said greatest deviation, and the step of calculating said allowable upper limit as a product of said calculated mean value and a predetermined coefficient.

31. A combination weighing method as set forth in claim 24, wherein said comparing step includes a step of calculating a mean value of the values of said weight-indicative signals in at least some of the combinations, the step of calculating a sum of deviations of the values of said weight-indicative signals from said calculated mean value, and the step of seeking the combination having the least value of said sum.

32. A combination weighing method as set forth in claim 24, wherein said comparing step includes a step of calculating a mean value of the values of said weight-indicative signals in at least some of the combinations, the step of calculating a sum of square deviations of the values of said weight-indicative signals from said calculated mean value, and the step of seeking the combination having the least value of said sum.

33. A combination weighing method as set forth in claim 24, wherein said comparing step includes the step of reducing said predetermined number of members and resuming the operation to select a combination with a reduced number of members when no satisfactory combination having the predetermined number of members is obtainable.

34. A combination weighing method as set forth in claim 22, wherein said comparing step includes the step of calculating a range of the values of said weight-indicative signals in at least some of the combinations, and the step of comparing at least some of said calculated ranges with said specific condition, said specific condition being a predetermined allowable upper limit for said range.

35. A combination weighing method as set forth in claim 22, wherein said comparing step includes the step of calculating a mean value and a range of the values of said weight-indicative signals in at least some of the combination, the step of comparing at least some of said calculated ranges with said specific condition, said specific condition being an allowable upper limit for said range, and the step of calculating said allowable upper limit as a product of said calculated mean value and a predetermined coefficient.

36. A combination weighing method as set forth in claim 22, wherein said comparing step includes the step of calculating a range of the values of said weight-indicative signals in at least some of the combinations, the step of seeking the combination having the least value of said range, and the step of comparing said least range with said specific condition, said specific condition being a predetermined allowable upper limit for said range.

37. A combination weighing method as set forth in claim 22, wherein said comparing step includes a step of calculating a mean value of the values of said weight-indicative signals in at least some of the combinations, the step of seeking the greatest deviation of the values of said weight-indicative signals from said calculated mean value, and the step of comparing said greatest deviation with said specific condition, said specific condition being a predetermined allowable upper limit for said greatest deviation.

38. A combination weighing method as set forth in claim 24, wherein said comparing step includes the step of calculating a mean value of the values of said weight-indicative signals in at least some of the combinations, the step of seeking the greatest deviation of the values of said weight-indicative signals from said calculated mean value, the step of comparing said greatest deviation with said specific condition, said specific condition being an allowable upper limit for said greatest deviation, and the step of calculating said allowable upper limit as a product of said calculated mean value and a predetermined coefficient.

39. A combination weighing method as set forth in claim 22, wherein said comparing step includes a step of calculating a mean value of the values of said weight-indicative signals in at least some of the combinations, the step of calculating a sum of deviations of the values of said weight-indicative signals from said calculated mean value, and the step of seeking the combination having the least value of said sum.

40. A combination weighing method as set forth in claim 22, wherein said comparing step includes a step of calculating a mean value of the values of said weight-indicative signals in at least some of the combinations, the step of calculating a sum of square deviations of the values of said weight-indicative signals from said calculated mean value, and the step of seeking the combination having the least value of said sum.

41. A combination weighing method as set forth in claim 22, wherein said comparing step includes the step of reducing said predetermined number of members and resuming the operation to select a combination with a reduced number of members when no satisfactory combination having the predetermined number of members is obtainable.

42. A method of making a combination of articles whose individuals weights are confined to a desired range, the method comprising the steps of:
 preselecting a target number m of articles for the combination;
 obtaining weight-indicative signals of a plurality of articles;
 combining the weight-indicative signals in combinations of m signals;
 selecting a combination of articles by determining whether their corresponding weight-indicative signals meet a predetermined condition which results in confining the weights of the articles in the combination to the desired range.

43. The method of making a combination according to claim 42 wherein the step of combining the weight-indicative signals comprises the step of arranging the weight-indicative signals in order of their magnitudes, and making combinations of consecutively ordered weight signals.

44. The method of making a combination according to claim 43 wherein the step of selecting a combination of articles comprises:
 preselecting a maximum allowance A corresponding to the maximum allowable variance of the individual weights of the articles in a combination;
 determining the range R of the weight-indicative signals of at least some of the combinations, and comparing the range R of the weight-indicative signals of at least some of the combinations with the preselected maximum allowance A.

45. The method of making a combination according to claim 44 further comprising the step of determining the combination with the lowest range R of weight-indicative signals, and wherein the comparing step comprises comparing the lowest range R with the maximum allowance A.

46. The method of making a combination according to claim 43 wherein the step of selecting a combination of articles comprises:
 preselecting a maximum allowance A corresponding to the maximum allowable variance of the individual weights of the articles in a combination from the mean weight of the articles in the combination;
 determining the mean of the weight-indicative signals of at least some of combinations;
 determining the maximum deviation between the individual weight-indicative signals of at least some of the combinations and their respective mean;
 comparing the maximum deviation of at least some of the combinations with the predetermined maximum allowance A.

47. The method of making a combination according to claim 43 wherein the step of selecting a combination of articles comprises:
 determining the mean of the weight-indicative signals of at least some of the combinations;
 determining the sum of deviations of the values of the weight-indicative signals from the mean for at least some of the combinations;
 determining the combination with the lowest sum.

48. The method of making a combination according to claim 43 wherein the step of selecting a combination of articles comprises:
 determining the mean of the weight-indicative signals of at least some of the combinations;
 determining for at least some of the combinations, the sum of the squared deviations of the values of the weight-indicative signals from the means;
 determining the combination with the lowest sum.

49. The method of making a combination according to claim 42 further comprising the step of combining the weight-indicative signals in combinations of m' signals, m' being a number less than m, if a combination with m signals cannot be selected, and selecting a combination of m' articles by determining whether their corresponding weight-indicative signals meet a predetermined condition which results in confining the weights of the articles in the combination to the desired range.

* * * * *